(12) United States Patent
Marchini et al.

(10) Patent No.: US 10,661,518 B2
(45) Date of Patent: May 26, 2020

(54) PROCESS AND EXPANDABLE FORMING DRUM FOR BUILDING TYRES FOR VEHICLE WHEELS

(71) Applicant: PIRELLI TYRE S.P.A., Milan (IT)

(72) Inventors: Maurizio Marchini, Milan (IT); Christian De Col, Sedico (IT)

(73) Assignee: PIRELLI TYRE S.P.A., Milan (IT)

( * ) Notice: Subject to any disclaimer, the term of this patent is extended or adjusted under 35 U.S.C. 154(b) by 173 days.

(21) Appl. No.: 15/549,894

(22) PCT Filed: Feb. 29, 2016

(86) PCT No.: PCT/IB2016/051109
§ 371 (c)(1),
(2) Date: Aug. 9, 2017

(87) PCT Pub. No.: WO2016/157001
PCT Pub. Date: Oct. 6, 2016

(65) Prior Publication Data
US 2018/0178468 A1    Jun. 28, 2018

(30) Foreign Application Priority Data

Mar. 31, 2015   (IT) .............................. MI2015A0461

(51) Int. Cl.
*B29D 30/36* (2006.01)
*B29D 30/24* (2006.01)
(Continued)

(52) U.S. Cl.
CPC ............. *B29D 30/36* (2013.01); *B29D 30/12* (2013.01); *B29D 30/24* (2013.01); *B29D 30/245* (2013.01);
(Continued)

(58) Field of Classification Search
CPC ...... B29D 30/12; B29D 30/24; B29D 30/245; B29D 30/36; B29D 2030/265; B29D 2030/2657
(Continued)

(56) References Cited

U.S. PATENT DOCUMENTS 3,883,387 A *   5/1975   Csatlos ................. B29D 30/24
                                                                156/415
4,220,494 A     9/1980   Kawaida et al.
(Continued)

FOREIGN PATENT DOCUMENTS

CN          1496303 A      5/2004
CN        102126297 A      7/2011
(Continued)

OTHER PUBLICATIONS

International Search Report for International Application No. PCT/IB2016/051109 filed on Feb. 29, 2016 in the name of Pirelli Tyre S.P.A.. dated Jun. 2, 2016. 6 pages.
(Continued)

*Primary Examiner* — Robert C Dye
*Assistant Examiner* — Sedef E Paquette
(74) *Attorney, Agent, or Firm* — Steinfl + Bruno, LLP

(57) ABSTRACT

A forming drum has circumferentially consecutive sectors that are radially movable between a contracted condition and an expanded condition in which the sectors are radially moved away from a geometric axis in order to define a radially external abutment surface. Each sector has circumferentially opposite coupling portions, each having circumferential projections alternated with circumferential cavities. The projections of each sector are slidably engaged in the respective cavities of circumferentially adjacent sectors. From at least one of the projections, at least one support wing is extended having a first side and a second side that
(Continued)

are respectively opposite. The first side coincides with a portion of the abutment surface and the second side at least partially overlaps one of the projections belonging to an adjacent sector. A process for building tyres employing the drum is also described.

29 Claims, 12 Drawing Sheets

(51) Int. Cl.
    *B29D 30/12*    (2006.01)
    *B29D 30/26*    (2006.01)

(52) U.S. Cl.
    CPC .................. *B29D 2030/265* (2013.01); *B29D 2030/2657* (2013.01)

(58) Field of Classification Search
    USPC ......................................... 156/414, 415, 417
    See application file for complete search history.

(56) References Cited

U.S. PATENT DOCUMENTS

| | | | |
|---|---|---|---|
| 5,635,016 A * | 6/1997 | Byerley | B29D 30/242 156/406.2 |
| 6,013,147 A | 1/2000 | Byerley | |
| 6,068,721 A | 5/2000 | Dyer et al. | |
| 8,678,059 B2 | 3/2014 | Lipsa | |
| 2004/0050499 A1 | 3/2004 | Barody | |
| 2006/0102272 A1 | 5/2006 | Iyanagi et al. | |
| 2008/0017298 A1 | 1/2008 | Iyanagi | |
| 2008/0190562 A1 | 8/2008 | Winkler et al. | |
| 2009/0020200 A1 | 1/2009 | Ogawa et al. | |
| 2010/0116439 A1 | 5/2010 | Lundell | |
| 2010/0193109 A1 * | 8/2010 | Cantu' | B29D 30/1657 156/117 |
| 2010/0200152 A1 * | 8/2010 | Marchini | B29D 30/1657 156/117 |
| 2011/0315323 A1 | 12/2011 | Lipsa | |
| 2012/0073728 A1 * | 3/2012 | Takasuga | B29D 30/245 156/110.1 |
| 2012/0168087 A1 * | 7/2012 | Byerley | B29D 30/242 156/417 |
| 2012/0255666 A1 | 10/2012 | Mancini | |
| 2013/0075041 A1 | 3/2013 | Marechal et al. | |
| 2014/0360673 A1 * | 12/2014 | Marcus, Jr. | B29D 30/242 156/417 |
| 2015/0239190 A1 * | 8/2015 | Currie | B29D 30/2607 156/417 |

FOREIGN PATENT DOCUMENTS

| | | |
|---|---|---|
| CN | 102245372 A | 11/2011 |
| DE | 102005055609 A1 | 5/2007 |
| EP | 1724099 A1 | 11/2006 |
| JP | 2004351956 A | 12/2004 |
| JP | 2005246844 A | 9/2005 |
| JP | 2012512068 A | 5/2012 |
| RU | 2222431 C2 | 1/2004 |
| RU | 2554863 C2 | 6/2015 |
| SU | 753673 A1 | 8/1980 |
| WO | 2004/012928 A1 | 2/2004 |
| WO | 2004/041520 A1 | 5/2004 |
| WO | 2004/041522 A1 | 5/2004 |
| WO | 2010/140485 A1 | 12/2010 |

OTHER PUBLICATIONS

International Written Opinion for International Application No. PCT/IB2016/051109 filed on Feb. 29, 2016 in the name of Pirelli Tyre S.P.A.. dated Jun. 2, 2016. 6 pages.
Chinese Office Action for Chinese Application No. 201680015670.8 filed on Feb. 29, 2016 on behalf of Pirelli Tyre S.P.A dated May 17, 2019 18 pages (English + Original).
Russian Office Action for RU Application No. 2017134362 filed on Feb. 29, 2016 on behalf of Pirelli Tyre S.P.A dated Jul. 10, 2019 11 pages (English + Original).
Notice of Reasons for Rejection for Japanese Application No. 2017541244 filed on Feb. 29, 2016 on behalf of Pirelli Tyre S.P.A dated Mar. 5, 2020 8 pages (English + Original).
Second Chinese Office Action for Chinese Application No. 201680015670.8 filed on Feb. 29, 2016 on behalf of Pirelli Tyre S.P.A dated Dec. 25, 2019 21 pages (English + Original).
Supplementary Translation of Second Chinese Office Action for Chinese Application No. 201680015670.8 filed on Feb. 29, 2016 on behalf of Pirelli Tyre S.P.A dated Dec. 25, 2019 9 pages.

* cited by examiner

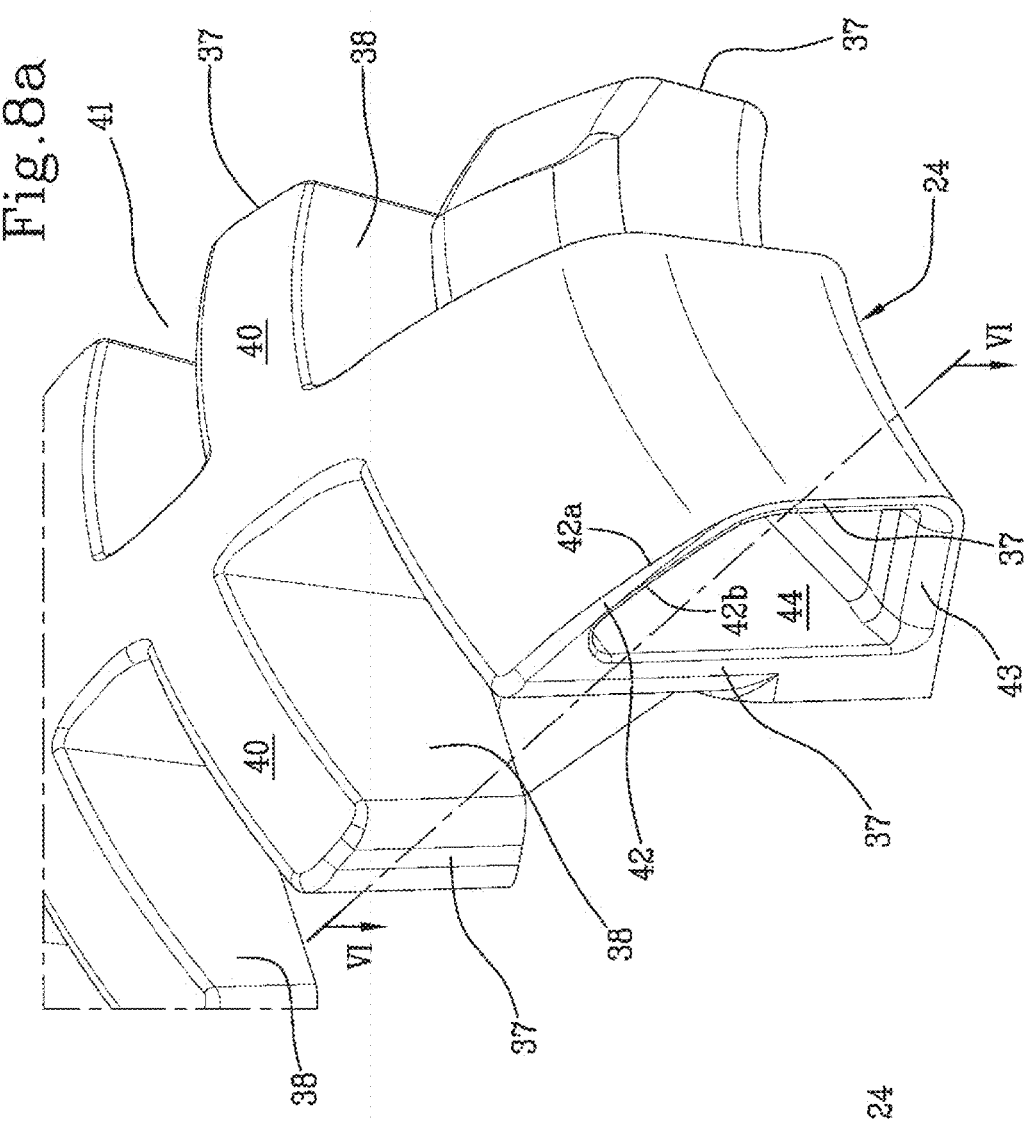
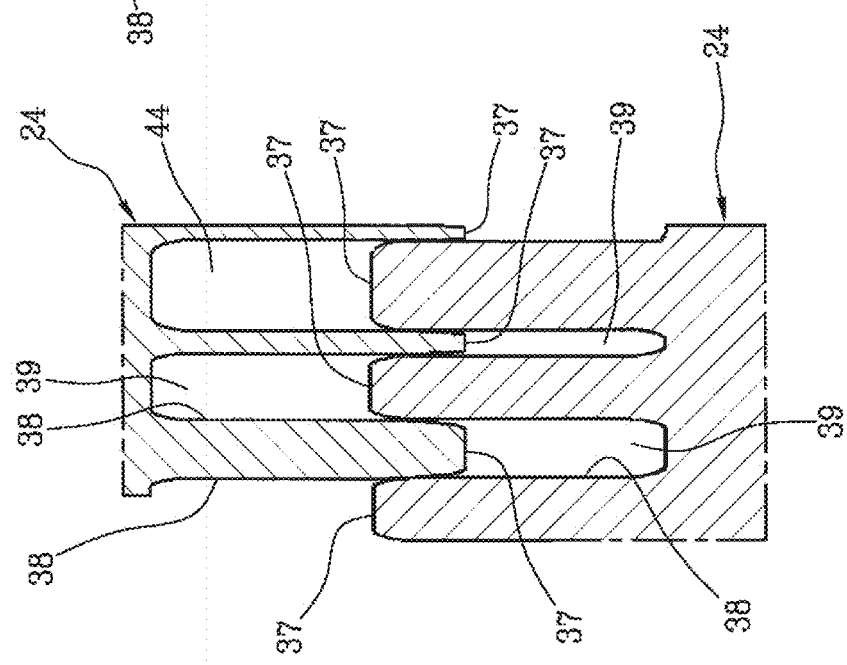

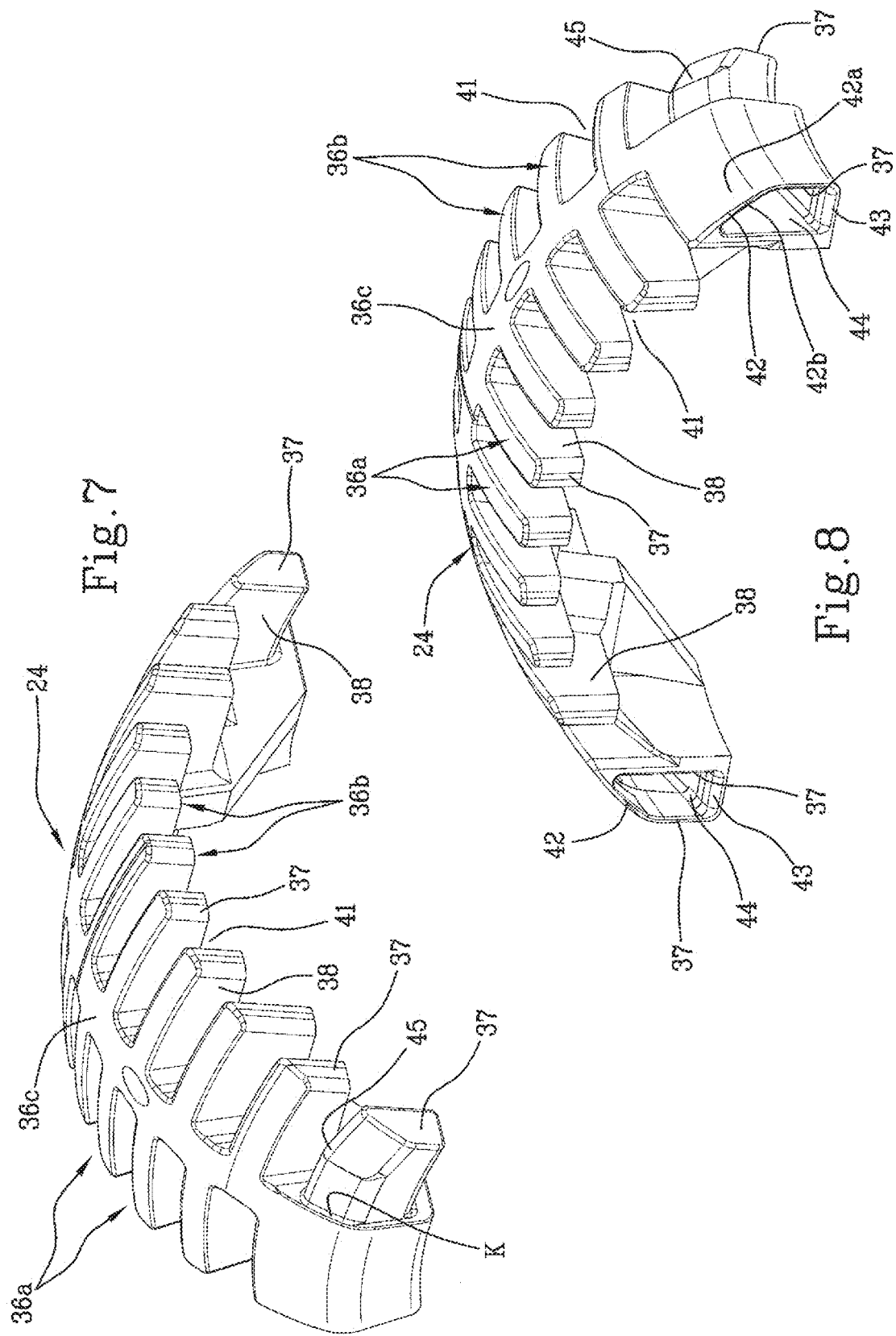

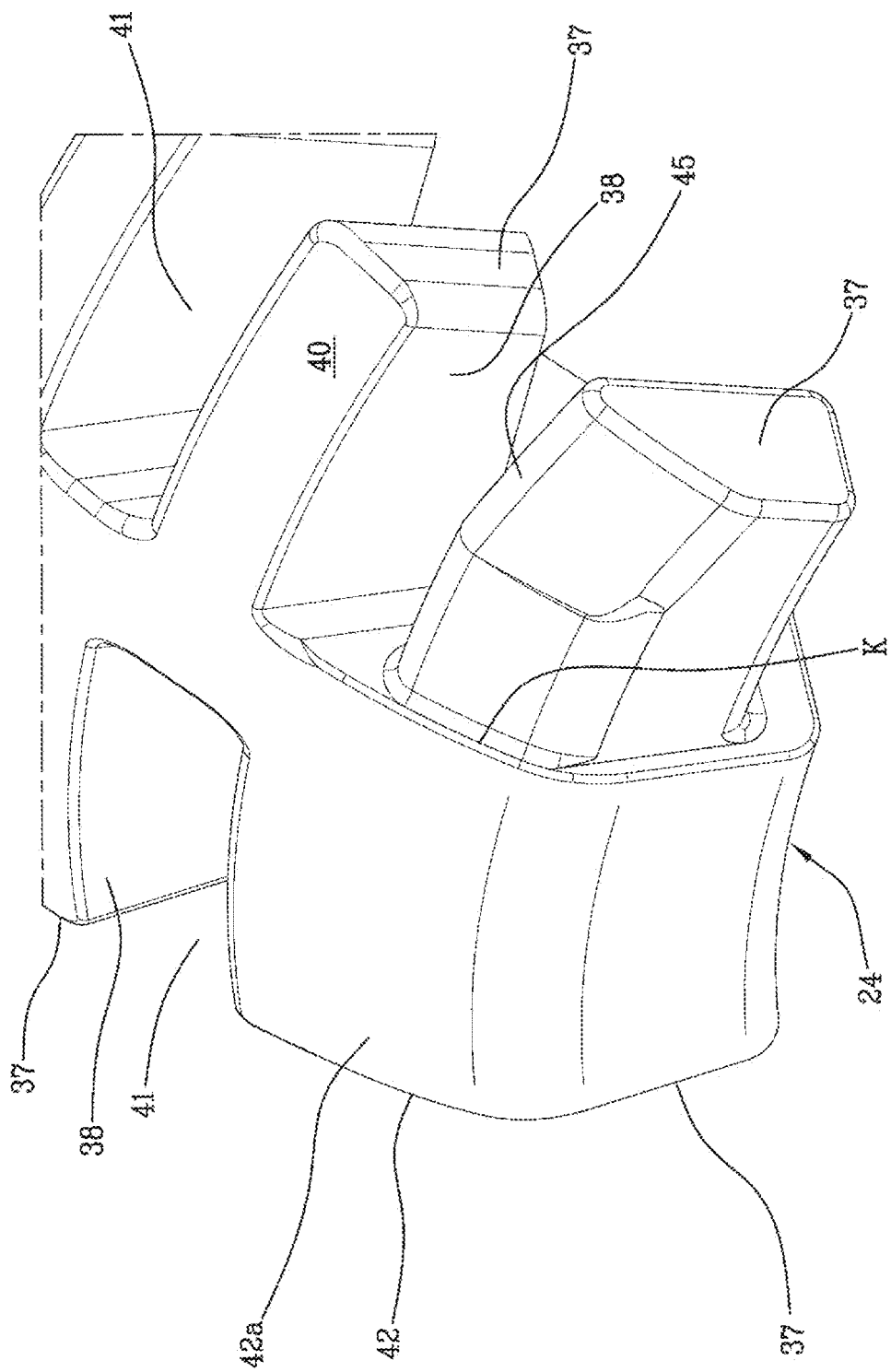

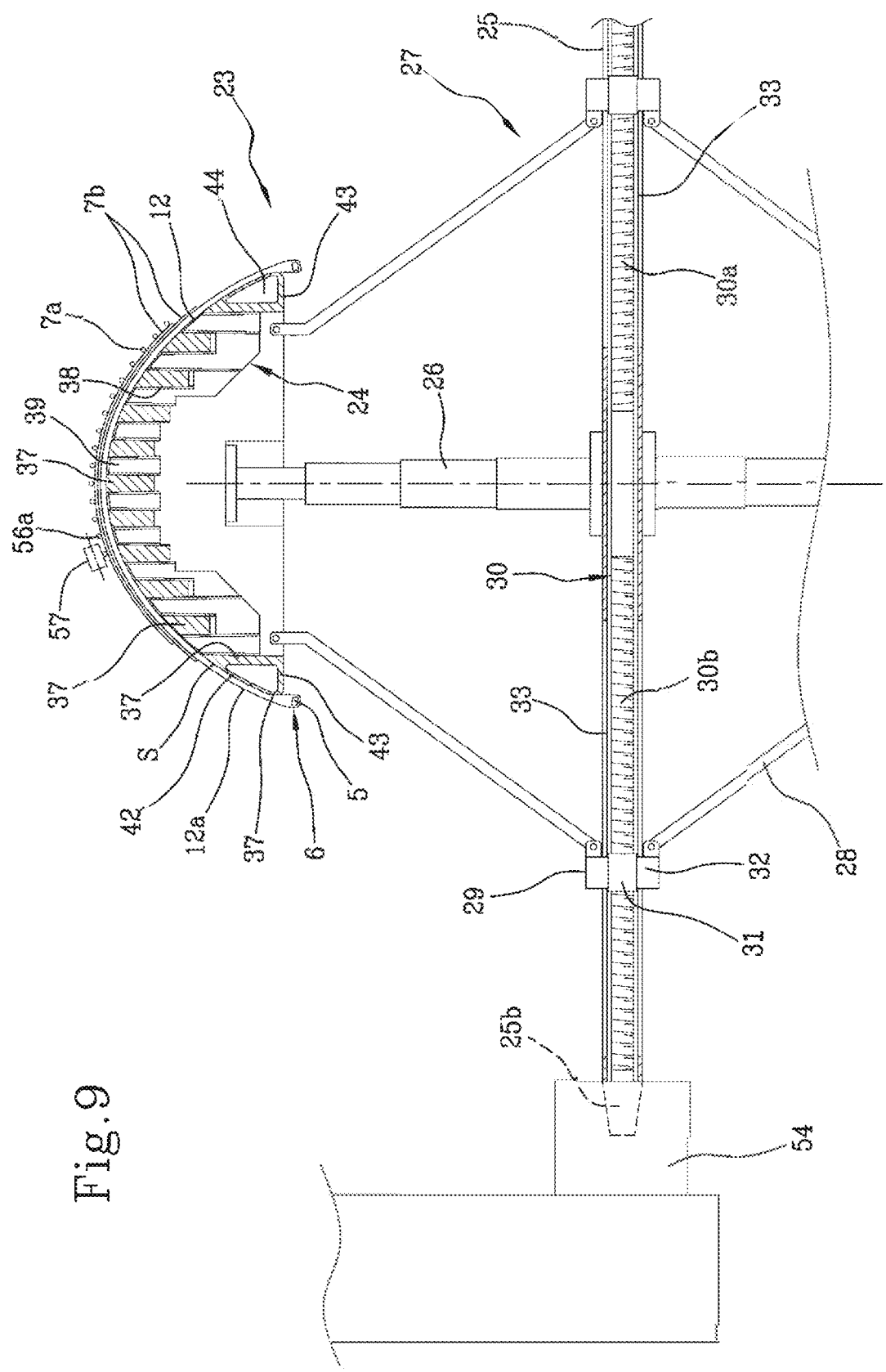

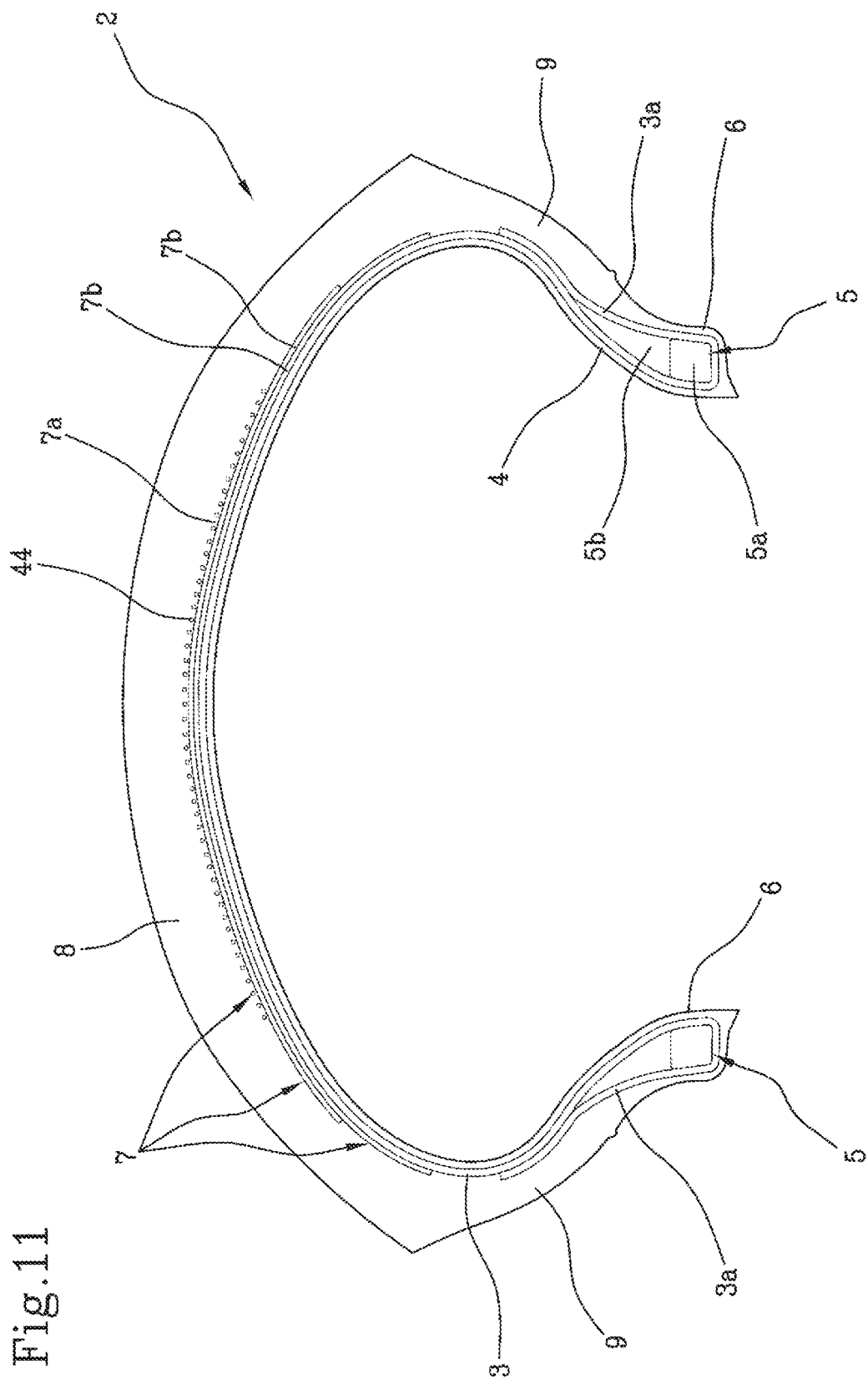

PROCESS AND EXPANDABLE FORMING DRUM FOR BUILDING TYRES FOR VEHICLE WHEELS

CROSS REFERENCE TO RELATED APPLICATIONS

The present application is the U.S. national stage of International Patent Application PCT/IB2016/051109 filed internationally on Feb. 29, 2016, which, in turn, claims priority to Italian Patent Application No. MI2015A000461 filed on Mar. 31, 2015.

The present invention relates to an expandable forming drum, and a process for building tyres for vehicle wheels.

More particularly, the invention is aimed for the building of green tyres, to be subsequently subjected to a vulcanisation cycle for the obtainment of the final product.

For the purpose of the present description, with the term "elastomeric material" it is intended to indicate a composition comprising at least one elastomeric polymer and at least one reinforcement filler. Preferably, such composition also comprises additives such as, for example a cross-linking agent and/or a plasticizing agent. Due to the presence of the cross-linking agent, by means of heating, such material can be cross-linked so as to form the final manufactured product.

By "tyre for two-wheel vehicles", in particular motorcycles, it is intended a tyre whose curvature ratio is approximately comprised between about 0.15 and about 0.45.

By "curvature ratio" relative to a tyre (or to a portion thereof) it is intended the ratio between the distance of the radially external point of the tread band (or of the external surface) from the line passing through the laterally opposite ends of the tread itself (or of the external surface itself), measured on a radial plane of the tyre (or of said portion thereof), and the distance measured along the chord of the tyre (or of a portion thereof) between said ends.

By "curvature ratio" relative to a forming drum, it is intended the ratio between the distance of the radially external point of the external surface of the drum from the line passing through the laterally opposite ends of the drum itself, measured on a radial plane of the drum, and the distance measured along the chord of the drum between said ends.

The terms "radial" and "axial" and the expressions "radially internal/external" and "axially internal/external" are used with reference to the radial direction of the forming drum used/of the tyre (i.e. to a direction perpendicular to the rotation axis of the aforesaid forming drum/tyre) and to the axial direction of the forming support used/of the tyre (i.e. to a direction parallel to the rotation axis of the aforesaid forming drum/tyre). The terms "circumferential" and "circumferentially" are instead used with reference to the annular extension of the aforesaid forming support/tyre.

A plane with respect to a forming drum or to a tyre is defined "radial" when it contains the rotation axis of the forming drum or of the tyre, respectively. By "elementary semifinished product" it is intended an continuous elongated element made of elastomeric material. Preferably such continuous elongated element can comprise one or more textile and/or metallic cords. Preferably such continuous elongated element can be cut to size.

By "component" or "structural component" of a tyre it is intended any one portion thereof capable of performing a function thereof, or a part thereof. The following are for example components of the tyre: the liner, the under-liner, the sidewall inserts, the bead cores, the filler inserts, the anti-abrasive element, the sidewalls, the carcass ply/plies, the belt layer/layers, the tread band, the under-layer of the tread band, the under-belt inserts etc.

A tyre for vehicle wheels generally comprises a carcass structure comprising at least one carcass ply having respectively opposite ends engaged with respective annular anchoring structures, integrated in the zones normally identified with the term "beads", having an internal diameter substantially corresponding to a so-called "fitting diameter" of the tyre on a respective mounting rim.

The carcass structure is associated with a belt structure which can comprise one or more belt layers, situated in radial superimposition with respect to each and with respect to the carcass ply, having textile or metallic reinforcement cords with crossed orientation and/or orientation substantially parallel to the circumferential extension direction of the tyre (at 0 degrees). A tread band is applied in radially external position with respect to the belt structure, such tread band also made of elastomeric material like other semifinished products constituting the tyre.

Respective sidewalls made of elastomeric material are also applied in axially external position on the lateral surfaces of the carcass structure, each extended from one of the lateral edges of the tread band up to the respective annular anchoring structure to the beads. In the tyres of "tubeless" type, a cover layer impermeable to air, normally termed "liner", covers the internal surfaces of the tyre.

Following the building of the green tyre actuated by means of assembly of respective components, a moulding and vulcanisation treatment is generally executed, aimed to cause the structural stabilisation of the tyre by means of cross-linking of the elastomeric compositions as well as impart on the same, if requested, a desired tread design and possible distinctive graphic marks at the sidewalls of the tyre.

The carcass structure, generally in sleeve form, and the belt structure are generally made separately from each other in respective work stations, in order to be mutually assembled together at a later time.

WO 2004/041520, in the name of the same Applicant, describes a shaping drum carried by an robotic arm that interacts with a transfer member carrying the belt structure picked up from an auxiliary drum, in order to cause the coupling between carcass structure and belt structure. The robotic arm then carries the shaping drum in proximity to devices for applying the tread band and/or the sidewalls comprising supply members arranged to deposit a continuous elongated element made of elastomeric material on the mutually coupled carcass and belt structure.

The document WO 2004/041522 illustrates a further example in which a shaping drum carried by a robotic arm is moved in order to interact with devices that complete the attainment of the green tyre, after having applied a belt structure that was previously formed on an auxiliary drum.

US 2009/0020200 describes the attainment of a tyre for two-wheel vehicles, in which a tread band is obtained by continuously spiral-winding a continuous elongated element made of elastomeric material in the circumferential direction of the tyre being processed, supported by a rigid drum whose external surface profile replicates the internal surface profile of the tyre being processed.

US 2013/0075041 proposes applying the crown structure of a tyre on a shaped carcass structure supported by a forming drum arranged at its interior. The forming drum has a pair of bead-gripping half-parts that are radially expandable in order to cause the engagement of the carcass structure, which is shaped according to a shape very close to the structure of a finished tyre, with a mutual approach of the half-parts themselves. A central forming group is also present in the drum that has two series of forming plates which, in an expanded condition, mutually mate in order to define a 360° continuous surface that supports the carcass structure. The plates belonging to one series and to the other series are mutually alternated and in a contracted condition the plates of one series radially translate within the plates of the second series.

The Applicant proposes significantly improving the quality of the product by optimising the deposition of single components of the tyre for the purpose of the building thereof.

In this regard, the Applicant has observed that by depositing an elementary semifinished product fed by a dispenser onto the toroidal forming drum, while the latter is suitably moved at the dispenser itself, it is possible to very precisely distribute the elementary semifinished product by means of side-by-side and/or at least partially superimposed coils, so as to form a desired structural component of the tyre (e.g. a belt layer, a tread band or a sidewall) with greater precision than that normally attainable when conventional piece semifinished products that are cut to size are used.

Nevertheless, the Applicant has perceived that the actuation of these principles on an expandable drum as is for example described in US 2013/075041 would be prevented, or at least obstructed, by the current impossibility of arranging a sufficiently light and manageable drum for the purpose of the transfer and movement thereof into one or more work stations set for the formation of the single components.

In this regard, the Applicant has observed that the use of plates with continuous abutment surface requires the division of the plates into two separate series, separately movable at respective subsequent times, in order to prevent mutual jamming and interference during the contraction and expansion of the drum. Complex driving mechanisms are consequently required, which considerably increase the overall weight of the drum. The need to separately move the plates, carrying one series of plates within the other in the contracted condition, also makes it difficult to confer sufficiently limited diameter size to the drum in the contracted condition.

The Applicant has perceived the possibility to attain a considerable lightening of the drum if in place of a continuous abutment surface, even if apparently optimal for the purpose of attaining the tyre components, sectors are used that are mutually interconnected at respectively complementary cavities. According to the Applicant, the lightening will not be exclusively due to the lower weight determined by the lack of material at the cavities, but also and above all to a simplification of the driving mechanisms and of the overall structure of the drum, since it will be possible to contract and expand the drum with a simultaneous movement of all the sectors present.

The Applicant has nevertheless observed that during the execution of the spiralling, when the drum is supported and suitably moved in order to manage the distribution of the elementary semifinished products, the thrust action exerted for example by an applicator roller tends to push the elementary semifinished product (together with the underlying parts of the carcass structure, if the spiralling is executed not directly on the forming drum but on the carcass structure of the tyre previously deposited on the drum) into the hollow portions of the abutment surface, towards the interior of the corresponding cavities.

In particular, the Applicant has also perceived that while, in the axially internal zones of the abutment surface, the structural consistency of the carcass structure is able to sufficiently resist the penetration into the cavity, this might not occur with the same effectiveness in proximity to the axially external zones, which lie on the axially opposite edges of the abutment surface.

This circumstance is even more evident in the processing of tyres with a high curvature ratio, typically seen for example in the tyres for motorcycles or other two-wheel vehicles. In a forming drum with high curvature ratio, in fact, the abutment surface has, in a given radial plane, an orientation that can continuously vary from the zones close to the axial centreline plane of the drum, where the abutment surface is substantially parallel to the rotation axis thereof, up to close to the axially opposite edges of the abutment surface, where the orientation of the latter is significantly tilted towards a substantially radial direction. Consequently, the cavities closest to the axially opposite edges of the forming drum generate, on the abutment surface, hollow portions of greater size than those generated by cavities with equal axial size that are close to the axial centreline plane. The Applicant has thus also perceived that the risks of deformation or breakage of the elementary semifinished products during deposition can be effectively limited or eliminated by suitably modulating the size and the geometric distribution of the cavities on the abutment surface.

In particular, the Applicant has perceived that for the purpose of a correct deposition of the elementary semifinished products, it is advantageous to manage the distribution of the cavities in a manner such that at the axially opposite circumferential edges of the abutment surface, the transverse width of the solid portions of the abutment surface is adapted to the building of the component(s) of the tyre in such zone.

The Applicant has more precisely found that by providing an expandable/contractible forming drum which in expanded configuration has a radially external abutment surface due to a plurality of circumferentially consecutive sectors, each defining circumferential projections alternated with circumferential cavities, in which from at least one of said projections, at least one support wing is extended, it is possible to reduce the risks of deformation and/or breakage of the elementary semifinished products during deposition, considerably improving the quality of the built green tyre.

In particular, the Applicant has found that in the axially opposite circumferential edges, the transverse width of the projections is suitably increased, and in this manner the building of the components of a tyre on the aforesaid forming drum by means of elementary semifinished products, preferably by means of spiralling, occurs without the latter being subjected to stresses such to compromise the integrity thereof.

According to a first aspect, the present invention relates to an expandable toroidal forming drum for building tyres.

Preferably circumferentially consecutive sectors are provided that are radially movable between a contracted condition, in which said sectors are moved closer to a geometric rotation axis of the forming drum, and an expanded condition in which the sectors are radially moved away from said geometric axis in order to define a radially external abutment surface.

Preferably, each sector has circumferentially opposite coupling portions, each comprising circumferential projections alternated with circumferential cavities.

Preferably, the projections of each sector are slidably engaged in the respective cavities of circumferentially adjacent sectors.

Preferably, from at least one of said projections, at least one support wing is extended having a first side and a second side that are respectively opposite.

Preferably, the first side coincides with a portion of said abutment surface and the second side at least partially overlaps one of the projections belonging to an adjacent sector.

In accordance with a second aspect, the invention relates to a process for building tyres.

Preferably, provision is made for arranging an expandable toroidal forming drum in expanded configuration such to externally have an abutment surface defined by a plurality of circumferentially consecutive sectors.

Preferably, provision is made for applying at least one elementary semifinished product of a tyre around said forming drum by pressing said elementary semifinished product towards the abutment surface.

Preferably, each sector has circumferential projections alternated with circumferential cavities.

Preferably, from at least one of said projections, at least one support wing is extended having a first side and a second side that are respectively opposite, in which the first side coincides with a portion of said abutment surface and the second side at least partially overlaps one of the projections belonging to an adjacent sector.

The Applicant deems that by increasing the surface extension of the solid portions in proximity to the axially opposite edges of the abutment surface, it is possible to ensure a correct application of the elementary semifinished products, even when such application is executed by means of spiralling of such products on the carcass structure supported by the forming drum.

In at least one of the aforesaid aspects, the invention comprises one or more of the following preferred characteristics, which are described hereinbelow.

Preferably, the second side of said at least one support wing is slidably engaged with said one of the projections belonging to an adjacent sector.

Preferably, in the expanded condition, the abutment surface has circumferential rows of solid portions alternated with hollow portions.

Preferably, said solid portions and hollow portions are respectively defined by said projections and by said cavities.

Preferably, multiple support wings are provided, carried by respective projections belonging to a same sector.

Preferably, a plurality of support wings are carried by projections arranged at axially opposite edges of each sector.

Preferably, a plurality of support wings are carried by consecutive projections to axially external projections.

Preferably, each support wing is integral with two respective projections that are axially consecutive to each other.

Preferably, each sector also has at least one base wall extended between two respective projections that are axially consecutive to each other, in order to define together with said projections and with said support wing a containment seat slidably engaging one of the projections belonging to an adjacent sector.

Preferably, each support wing has a thickness comprised between 0.5 mm and 2.5 mm, measured perpendicular to the abutment surface.

Preferably, said projections and cavities have circumferentially elongated shape.

Preferably, each of said cavities is axially delimited between lateral walls of two axially consecutive projections.

Preferably, said at least one support wing is extended from the respective projection according to a direction that is tilted with respect to at least one of the lateral walls of the projection itself.

Preferably, said lateral walls are extended according to planes that are substantially perpendicular to the geometric rotation axis of the forming drum.

Preferably, at least some of said cavities are each axially delimited between the lateral walls of two axially consecutive projections.

Preferably, in each sector, projections belonging to one of said coupling portions are offset with respect to the projections belonging to the other coupling portion.

Preferably, at least some of said projections have substantially plate-like structure and lie according to surfaces parallel to a circumferential extension direction of the abutment surface.

Preferably, projections arranged along axially opposite circumferential edges of the abutment surface each have a radially external longitudinal edge with longitudinal profile tilted towards said geometric rotation axis.

Preferably, in the contracted condition, the projections are inserted in the cavities according to a measurement at least equal to 80% of their length. More preferably said projections are inserted in the cavities according to a measurement comprised between about 80% and about 100% of their length.

Preferably, in the expanded condition, the projections are extracted from the cavities according to a measurement at least equal to 80% of their length.

More preferably said projections are extracted from the cavities according to a measurement comprised between about 80% and about 100% of their length.

Preferably, at least in proximity to an axial centreline plane of the forming drum, each projection has an axial size comprised between about 4 mm and about 15 mm.

Preferably, the hollow portions in the expanded condition have a circumferential size comprised between about 30 mm and about 60 mm.

Preferably, radial movement devices are also provided for simultaneously moving the sectors between the contracted condition and the expanded condition.

Preferably, said radial movement devices comprise transmission mechanisms operatively engageable by actuator devices and configured for simultaneously translating the sectors from the contracted condition to the expanded condition.

Preferably, said transmission mechanisms comprise driving levers, each hinged to one of said sectors and to at least one driving collar slidably fit along a central shaft.

Preferably, the driving collar is operatively connected to a threaded bar rotatably engaged in the central shaft.

Preferably, two driving collars are provided that are slidably engaged on the central shaft in axially opposite positions with respect to the sectors, and engaging the threaded bar at respective right hand and left hand threads.

Preferably, the sectors are carried by respective guide members that are telescopically extendable, radially extended from a central shaft.

Preferably, the drum has, in expanded condition, a curvature ratio comprised between about 0.15 and about 0.45.

Preferably provision is made for building and shaping a carcass sleeve according to a toroidal configuration.

Preferably, provision is made for engaging said expandable toroidal forming drum within the shaped carcass sleeve, in order to support the carcass sleeve against said abutment surface.

Preferably, provision is made for applying said at least one elementary semifinished product of said tyre around the shaped carcass sleeve supported by said abutment surface of said forming drum.

Preferably, said abutment surface has circumferential rows of solid portions alternated with hollow portions.

Preferably, the hollow portions of each circumferential row are circumferentially offset with respect to the hollow portions of axially adjacent circumferential rows.

Preferably, said carcass sleeve comprises at least one carcass ply and a pair of annular anchoring structures engaged with axially opposite ends of said at least one carcass ply.

Preferably, the carcass sleeve engaged with the forming drum has axially opposite end flaps projecting cantilevered with respect to the abutment surface.

Preferably, the elementary semifinished product is applied according to axially contiguous and/or at least partially superimposed circumferential coils, in order to form a component of said tyre.

Preferably, the elementary semifinished product is pressed against the abutment surface by means of a localised thrust action against a surface portion of said elementary semifinished product.

Preferably, the thrust action is exerted by pressing an applicator roller against the elementary semifinished product while the forming drum rotates around a geometric rotation axis thereof.

Preferably, the elementary semifinished product is pressed by means of a localised thrust action in an action area having transverse size less than the transverse size of the hollow portions.

Preferably, the transverse size of the action area can be measured against the abutment surface in a radial plane of the forming drum.

Further characteristics and advantages will be clearer from the detailed description of a preferred but not exclusive embodiment of an expandable forming drum for building tyres for vehicle wheels and of a process for building tyres, in accordance with the present invention.

Such description will be set forth hereinbelow with reference to the enclosed drawings, provided only as a non-limiting example, in which:

FIG. 1 schematically shows a top view of a plant for building tyres;

FIG. 2 schematically shows a side view in partial section of the loading of a carcass sleeve on a shaping station;

FIG. 3 schematically shows a side view in partial section of the engagement of the carcass sleeve with shaping devices arranged in the shaping station;

FIG. 3a shows an enlargement of the detail indicated with "A" in FIG. 3;

FIG. 4 schematically shows a side view in partial section of the execution of the shaping of the carcass sleeve;

FIG. 6a shows a detail of the sectors of FIG. 6 sectioned according to the line VI-VI of FIG. 8a;

FIGS. 7 and 8 show a single sector of the forming drum seen in perspective view from respectively opposite angles;

FIGS. 7a and 8a show respective enlarged details of FIGS. 7 and 8;

FIG. 9 shows the application of a belt layer on the shaped carcass sleeve and coupled to the forming drum;

Figure 1:
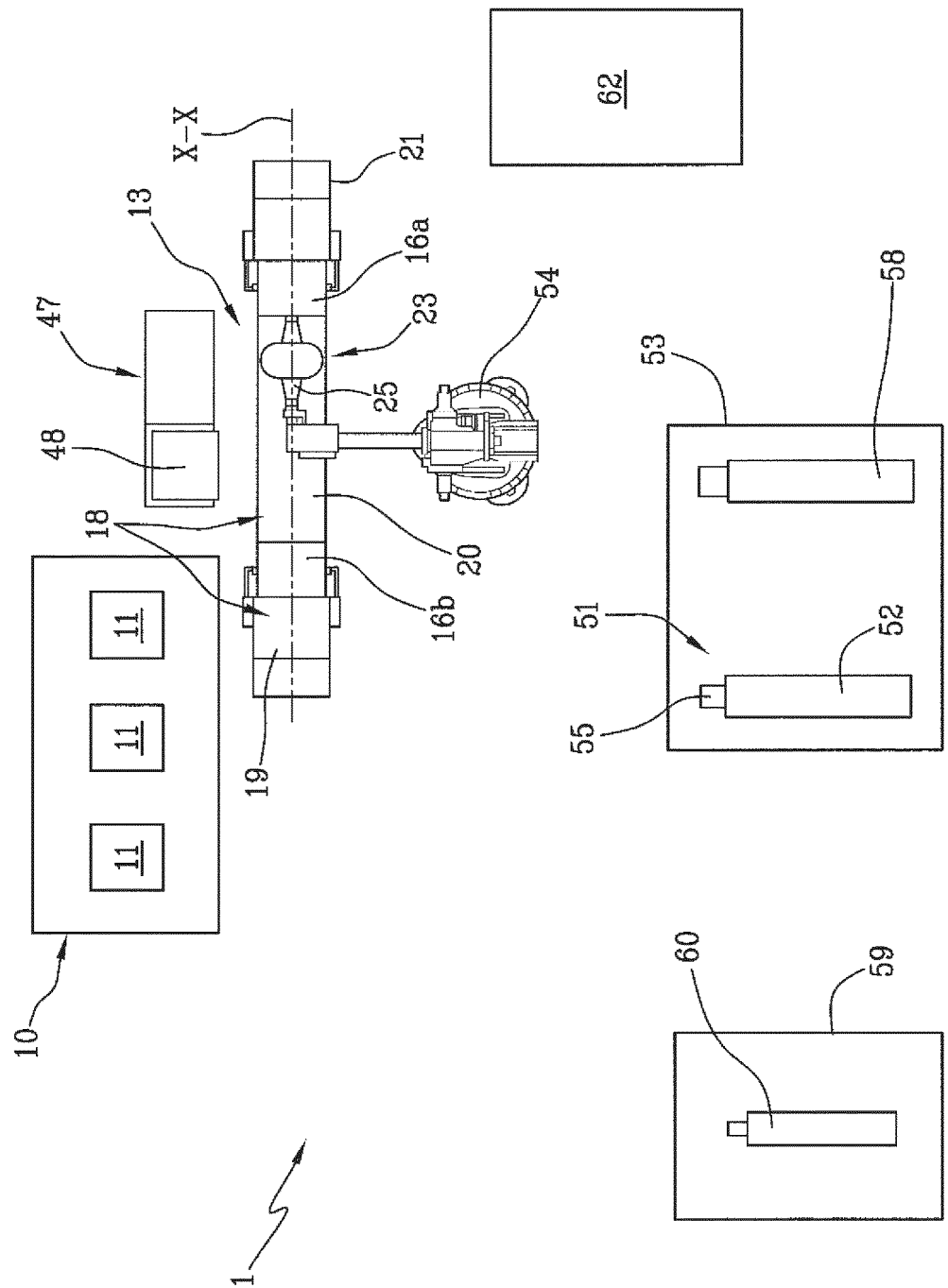

FIG. 11 schematically shows, in radial half-section, a tyre attainable in accordance with the present invention.

With reference to the abovementioned figures, reference number 1 overall indicates a plant for building tyres for vehicle wheels. The plant 1 is arranged for actuating a building process in accordance with the present invention.

The plant 1 is set for attaining tyres 2 (FIG. 11) essentially comprising at least one carcass ply 3 preferably internally covered by a layer of impermeable elastomeric material or so-called liner 4. Two annular anchoring structures 5, each comprising a so-called bead core 5a preferably carrying an elastomeric filler 5b in radially external position, are engaged with respective ends 3a of the carcass ply/plies 3. The annular anchoring structures 5 are integrated in proximity to zones normally identified with the term "beads" 6, at which the engagement between the tyre 2 and a respective mounting rim (not depicted) normally occurs.

A belt structure 7 is circumferentially applied around the carcass ply/plies 3, and a tread band 8 is circumferentially superimposed on the belt structure 7. Two sidewalls 9, each extended from the corresponding bead 6 to a corresponding lateral edge of the tread band 8, are applied in laterally opposite positions on the carcass ply/plies 3.

The plant 1 comprises a carcass building line 10 having one or more building stations 11 where the manufacturing of a carcass sleeve 12 is attained, for example according to known modes, such carcass sleeve 12 having substantially cylindrical shape. The carcass sleeve 12 comprises said at least one carcass ply 3, preferably internally covered with the liner 4, and having respective axially opposite ends 3a engaged, e.g. by means of turning-up, with the respective annular anchoring structures 5. If required, the carcass sleeve 12 can also comprise the sidewalls 9 or first portions thereof, each extended starting from a respective bead 6.

The carcass building line 10 leads to a shaping station 13 comprising devices 14 for engaging the carcass sleeve 12 and shaping devices 15, upon whose action the carcass sleeve 12 is shaped according to a toroidal configuration.

The engagement devices 14 for example comprise a first flange element 16a and a second flange element 16b, coaxially facing each other and having respective circumferential engagement seats 17a, 17b, by means of which they are each operatively engageable at one of the annular anchoring structures 5 respectively carried by the axially opposite ends of the carcass sleeve 12.

The engagement devices 14 can also comprise axial movement members 18 for moving the flange elements 16a, 16b. More in detail, provision can be made such that at least one of the flange elements 16a, 16b, e.g. the first flange element 16a, is carried by a carriage 19 movable along one or more linear guides 20, parallel to a direction of mutual axial alignment between the flange elements 16a, 16b and preferably integral with respect to a fixed base 21, carrying the second flange element 16b. The movement of the carriage 19 along the linear guides 20 causes the switching of the shaping station 13 between a condition of loading/unloading and a working condition. In the loading/unloading condition (FIG. 2), the first flange element 16a is spaced from the flange element 16b according to a measurement that is greater—approximately at least double—than an axial size of the non-shaped carcass sleeve 12, coming from the carcass building line 10. In the working condition, the flange elements 16a, 16b, and more precisely the respective circumferential engagement seats 17a, 17b thereof, are mutually spaced according to a measurement substantially corresponding to the axial size of the carcass sleeve 12.

The shaping devices 15 can for example comprise a fluid-dynamic circuit (not illustrated) for introducing pressurised air or another operating inflation fluid between the flange elements 16a, 16b, within the carcass sleeve 12. The shaping devices 15 can also comprise one or more linear actuators or other axial movement devices 22, operating on one or preferably both the flange elements 16a, 16b in order to axially move them towards each other starting from the aforesaid working condition. Mutually nearing the flange elements 16a, 16b causes a mutual approaching of the annular anchoring structures 5 so as to allow the shaping of the carcass sleeve 12 according to a toroidal configuration, assisted by the simultaneous introduction of the pressurised operating fluid in the carcass sleeve 12.

In the shaping station 13, the shaped carcass sleeve 12 is coupled to a toroidal forming drum 23, substantially rigid and expandable, arranged inside the carcass sleeve itself.

In FIGS. 1 to 4, the forming drum 23 is only schematically displayed, while it is depicted in more detail in FIGS. 5 to 10.

The forming drum 23 is expandable between a radially contracted condition (FIGS. 2, 3 and 5), and a radially expanded condition (FIGS. 4, 6, 9 and 10). For such purpose, the forming drum 23 comprises a plurality of sectors 24 circumferentially distributed around a central shaft 25 coaxial with geometric rotation axis X-X of the drum itself.

In FIGS. 1 to 4, the geometric axis X-X of the drum coincides with an axial alignment direction of the flange elements 16a, 16b.

The sectors 24 are movable upon action of radial movement devices 35, preferably simultaneously with each other, from the aforesaid contracted condition in which they are moved close to the central shaft 25, to the expanded condition in which said sectors 24 are moved away from the central shaft 25. For such purpose, it can be provided that the sectors 24 are carried by respective guide members 26 that are telescopically extendable, radially extended from the central shaft 25.

Preferably, the contracted and expanded condition of the sectors 24 respectively correspond to a condition of maximum radial contraction and a condition of maximum radial expansion of the forming drum 23.

The movement of the sectors 24 can be attained by means of transmission mechanisms 27 comprising for example driving levers 28 that are hinged, each at the respectively opposite ends thereof, to one of said sectors 24 and to at least one driving collar 29 slidably fit along the central shaft 25. More particularly, a pair of driving collars 29 are preferably provided, situated along the central shaft 25 in axially opposite positions with respect to the sectors 24, each engaging respective driving levers 28.

Each driving collar 29 is operatively connected to a threaded bar 30, rotatably engaged coaxially within the central shaft 25. The threaded bar 30 is extended along the central shaft 25, nearly for the entire length thereof or beyond, and carries two axially opposite threads 30a, 30b, respectively right hand and left hand threads. Respective nut threads 31 are operatively engaged on the threads 30a, 30b; such nut threads 31 are axially movable within the central shaft 25, each connected to one of the driving collars 29, e.g. by means of at least one block 32 radially traversing the central shaft 25 at a longitudinal slit 33.

The rotation of the threaded bar 30 in the central shaft 25, actuatable by means of a rotary driver 34 or actuator devices of another type operating in the shaping station 13, causes an axial movement of the nut screws 31 and of the driving collars 29, corresponding to a radial movement of the sectors 24, towards the contracted condition or the expanded condition in accordance with the rotation direction of the threaded bar 30.

In the expanded condition, the set of sectors 24 of the forming drum 23 defines, along its circumferential extension, a radially external abutment surface "S", toroidally shaped according to an internal configuration that a part of the carcass sleeve 12 must assume upon completed shaping. More in detail, provision can be advantageously made such that the abutment surface "S" of the forming drum 23 in the expanded condition has a curvature ratio comprised between about 0.15 and about 0.45, typically adapted for attaining tyres for motorcycles or other two-wheel vehicles. If required, curvature ratios can nevertheless be employed with values less than those indicated above, e.g. adapted for the production of tyres for cars or trucks.

As illustrated in FIGS. 7 and 8, each of the sectors 24 has a first coupling portion 36a and a second coupling portion 36b that are circumferentially opposite, preferably interconnected by means of an intermediate portion 36c that has, at least on the abutment surface "S", a main extension direction parallel to a radial plane of the forming drum 23. Each of the coupling portions 36a, 36b has a plurality of elongated projections 37 extended in circumferential direction from the intermediate portion 36c, alternated with respective circumferentially elongated cavities 39.

In a same sector 24, the projections 37 belonging to one of the coupling portions, e.g. the first coupling portion 36a, are offset with respect to the projections 37 of the other coupling portion 36b.

At least some of the projections 37 can have substantially plate-like structure, and lie according to surfaces parallel to an circumferential extension direction of the abutment surface "S". Such projections 37 therefore have lateral walls 38 extended according to planes orthogonal to the geometric rotation axis of the drum. At least some of the cavities 39 are each axially delimited between the lateral walls 38 of two axially consecutive projections 37. As is better illustrated in FIGS. 5 and 6, the projections 37 of each sector 24 are slidably engaged in the respective cavities 39 of the circumferentially adjacent sectors 24, and are adapted to slide in the cavities themselves in order to support the expansion and contraction movements of the forming drum 23.

The lateral walls 38 of the respectively mating projections 37 belonging to circumferentially contiguous sectors 24 mutually guide the sectors themselves during the contraction and expansion movement, and facilitate the maintenance of a satisfactory structural solidity of the forming drum 23 in its entirety, both in the contracted condition and in the expanded condition.

In the contracted condition, the projections 37 of each sector 24 penetrate into the respective cavities 39 until they touch or nearly touch the intermediate portion 36c of the adjacent sector 24. More particularly, in the contracted condition, the projections 37 are inserted in the respective cavities 39 according to a measurement at least equal to 80% of their length.

In the expanded condition, the projections 37 are extracted from the cavities 39 according to a measurement at least equal to 80% of their length.

The presence of the projections 37, of the cavities 39 and their mutual relation ensure that on the abutment surface "S", circumferential rows of solid portions 40 defined by the projections 37, alternated with hollow portions 41 defined by the cavities 39, are identifiable at least in the expansion condition. The solid portions 40 and the hollow portions 41 belonging to each circumferential row are circumferentially offset with respect to the solid portions 40 and, respectively, to the hollow portions 41 of axially adjacent circumferential rows.

It is opportune that the surface discontinuities induced by the alternation of solid portions 40 and hollow portions 41 do not compromise a correct execution of the attainment of the components of the tyre 2 during building. In this regard, it is preferably provided that at least in proximity to an axial centreline plane "E" of the forming drum 23, still more preferably over all the projections 37 except for those situated in proximity to the axially opposite circumferential edges of the forming drum 23, each projection 37 has axial size approximately comprised between about 4 mm and about 15 mm, preferably equal to about 8 mm. Each cavity 39 preferably has axial size equal to that of the projections 37 circumferentially aligned therewith.

Axial sizes that are greater than the indicated values could prove excessive for the purpose of a correct support of the carcass sleeve 12 and/or of other components of the tyre 2, also in consideration of the stresses transmitted during processing. Axial sizes that are smaller than the indicated values could in turn involve excessive structural complication of the sectors 24, with consequent increase of production costs, in addition to possible structural weakening.

It is also preferably provided that the hollow portions 41 in the expanded condition have a circumferential size comprised between about 30 mm and about 60 mm, preferably equal to about 40 mm.

At the axially opposite circumferential edges of the abutment surface "S", the above-indicated axial sizes of the projections 37 and cavities 39 may prove unsuited for the purpose of a correct processing.

In this regard, it should be observed that due to the curvature presented by the cross section profile of the abutment surface "S", the transverse size of the solid portions 40 and hollow portions 41 is not equal to the axial size of the corresponding projections 37 and cavities 39 to which they belong. In particular, in the forming drums dedicated for attaining tyres for two-wheel vehicles, where the curvature ratio is relatively accentuated, the transverse size of the solid portions 40 and of the hollow portions 41 at the axially opposite circumferential edges can be several times greater than that found in proximity to the axial centreline plane "E".

Consequently, axially opposite terminal portions 12a of the carcass sleeve 12, situated at the opposite circumferential edges of the abutment surface "S", may prove to be inadequately supported and too free to move for the purpose of a suitable opposition to stresses.

Provision is therefore made such that, from at least one of the projections 37, at least one support wing 42 substantially arranged on continuation of the abutment surface "S" is extended, according to an incident direction with respect to at least one of its lateral walls 38.

More particularly, multiple support wings 42 are provided, extended from respective projections 37 belonging to at least one same circumferential row, close to one of the axially opposite circumferential edges of the abutment surface "S".

In the illustrated example, the support wings 42 are integral with the projections 37 belonging to the first coupling portion 36a of each sector 24. The support wings 42 are substantially adapted to "fill" the respective hollow portions 41 which would otherwise be delimited by the cavities 39 defined between axially contiguous projections 37, so as to offer a support base for the carcass sleeve 12 that is sufficiently extended in order to ensure a suitable support thereof.

In the illustrated example, each sector 24 has two support wings 42 arranged each in proximity to one of the opposite circumferential edges of the abutment surface "S". Each support wing 42 is integral with two respective projections 37 that are axially consecutive to each other, i.e. two projections immediately successive in an axial direction, substantially extending as a bridge from one projection to the next.

Alternatively, the support wings 42 can each be integral with a single projection 37, and protrude towards the axially consecutive projection 37, i.e. immediately successive in axial direction, without coming to be joined therewith. More particularly, the support wings 42 can be integral with the single projections 37 belonging to the axially external circumferential rows, indicated with F1, arranged along each of the axially opposite circumferential edges of the abutment surface "S". Additionally or alternatively, the support wings 42 can be integral with the single projections 37 belonging to the circumferential rows, indicated with F2, axially contiguous with the axially external circumferential rows F1.

The axial sizes of the projections 37 and cavities 39 at the axially opposite circumferential edges of the abutment surface "S" can be different from those found in the remaining axially more internal portions of the forming drum 23. More particularly, in the illustrated example, the presence of the support wings 42 allows limiting the axial sizes of the projections 37 integral therewith. In particular, the axial size of the projections 37 integral with the support wings 42 can for example be comprised between about 2 mm and about 4 mm.

Each support wing 42 has a first side 42a and a second side 42b that are respectively opposite, not necessarily parallel to each other. The first side 42a coincides with the abutment surface "S". The second side 42b overlaps one of the projections 37 belonging to an adjacent sector 24 and is preferably slidably engaged therealong. More particularly, the support wings 42 overlap, each by means of the respective second side 42b, projections 37 belonging to the second coupling portion 36b of the adjacent sector 24.

In the illustrated example, in combination with each support wing 42, at least one base wall 43 is preferably provided which is extended between the projections 37, axially consecutive to each other, with which the support wing 42 itself is integral. The base wall 43 defines, together with the respective projections 37 and with the support wing 42, a containment seat 44 in which the respective projection 37 belonging to the adjacent sector 24, and more particularly to the second coupling portion 36b thereof, is slidably inserted.

The containment seat 44 and the projection 37 slidably inserted therein are respectively counter-shaped and preferably are complementary.

Between the first side 42a and the second side 42b, a thickness of the support wing 42 is defined, having measurement preferably comprised between about 0.5 mm and about 2.5 mm, detected perpendicular to the abutment surface "S". If the first side 42a and the second side 42b are not parallel, the above-indicated measurement refers to a point of minimum thickness of the support wing 42.

For each support wing 42 to be able to overlap the respective projection 37, still maintaining the first side 42a thereof coplanar with the abutment surface "S", a height difference "K" corresponding to the thickness of the support wing itself is generated between said abutment surface "S" and the projection 37 insertable in the containment seat 44.

In passing from the expanded condition to the contracted condition, the sectors 24 simultaneously translate towards the geometric rotation axis X-X of the forming drum 23, being mutually approached according to a substantially circumferential direction. In order to assist such mutual movement without jamming due to mechanical interferences, it is preferably provided that at least the projections 37 engaged in the containment seats 44 each have a radially external longitudinal edge 45 with longitudinal profile tilted towards the geometric rotation axis X-X.

Preferably, the forming drum 23 is positioned in the shaping station 13 before the respective carcass sleeve 12, e.g. still being processed along the carcass building line 10, reaches the shaping station itself.

More particularly, it is preferably provided that the forming drum 23 is supported cantilevered in the shaping station 13. For example, a first end 25a of the central shaft 25 of the forming drum 23 can for such purpose be retained by a mandrel 46 coaxially housed in the first flange element 16a and carrying the aforesaid rotary driver 34 couplable with the threaded bar 30 in order to drive it in rotation.

The forming drum 23 can therefore be arranged in the contracted condition by means of said rotary driver 34, if it is not already found in such condition upon reaching the shaping station 13.

By means of carcass loading devices 47, the carcass sleeve 12 coming from the carcass building line 10 is then transferred into the shaping station 13 in order to be subsequently coaxially arranged in radially external position around the forming drum 23 arranged in the contracted condition.

Figure 2:
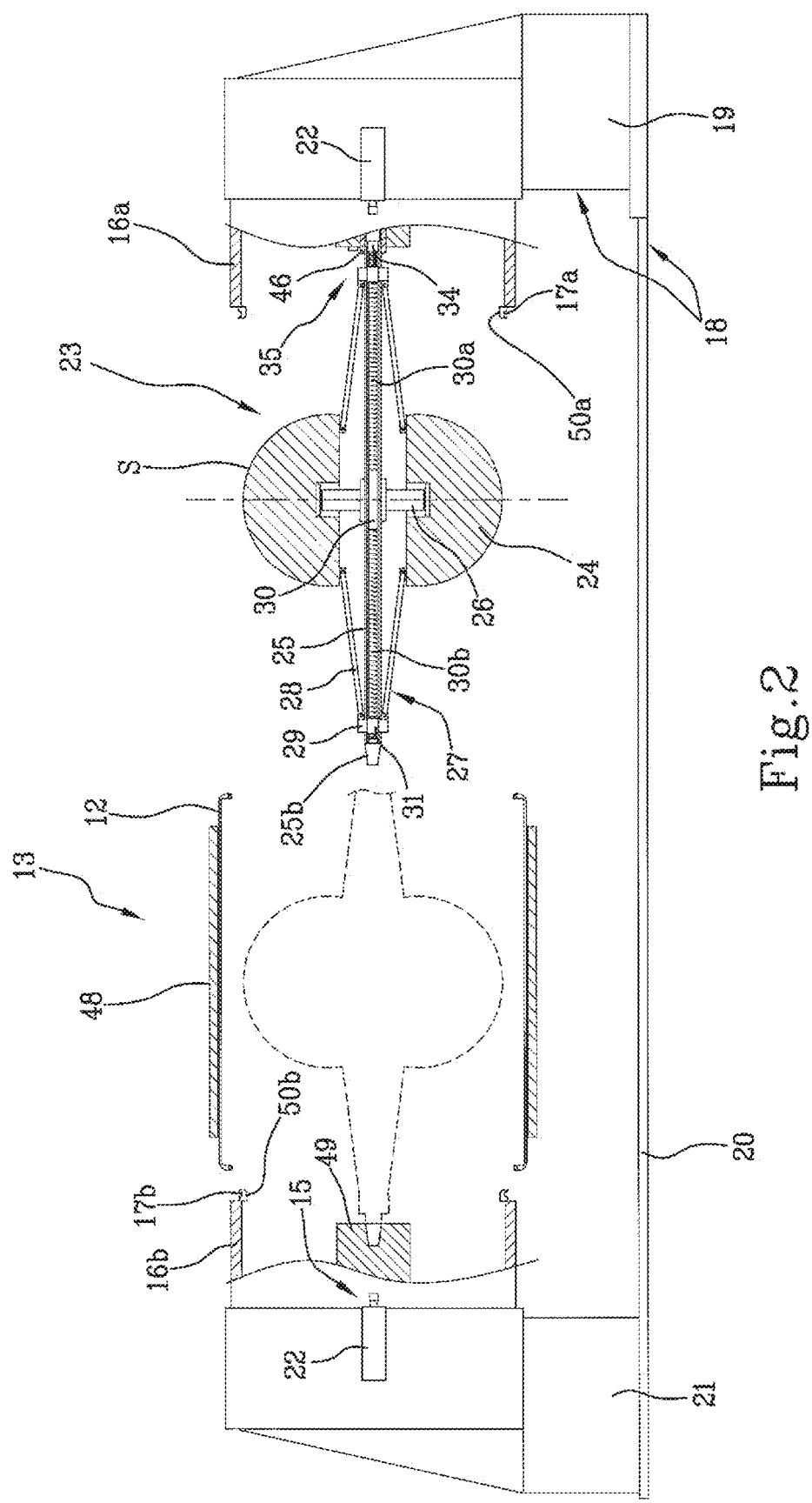
Figure 3:
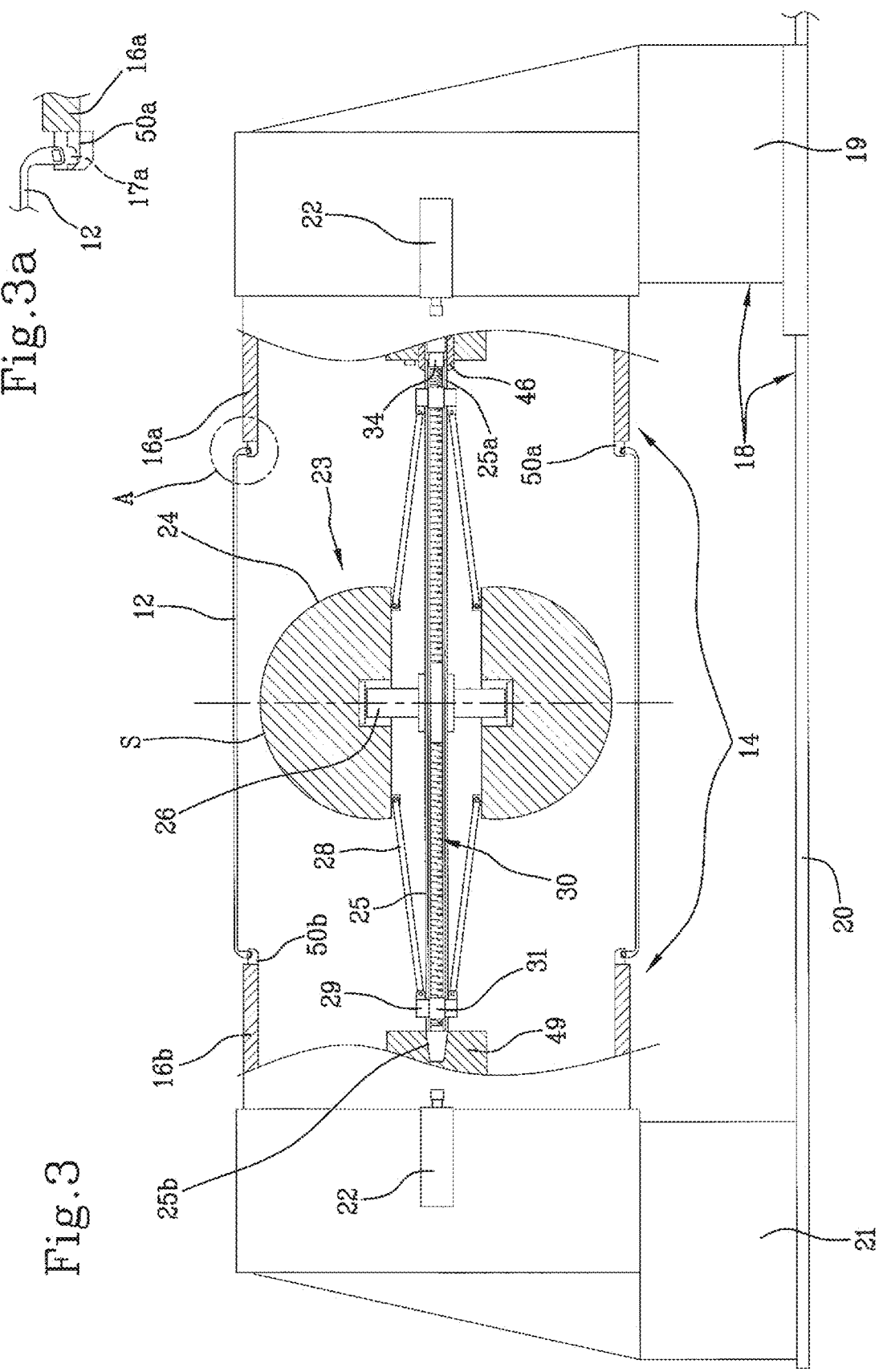
Figure 4:
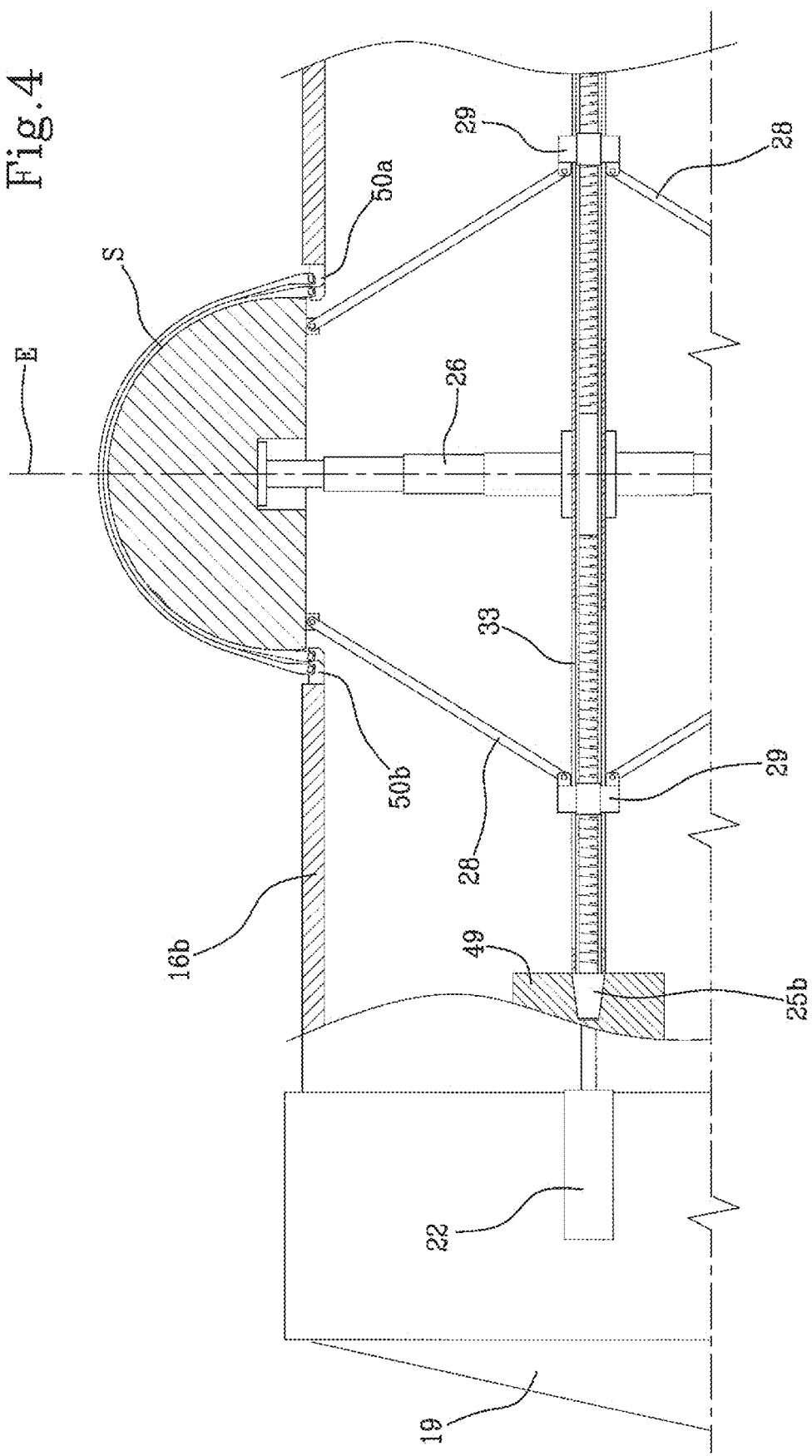
Figure 5:
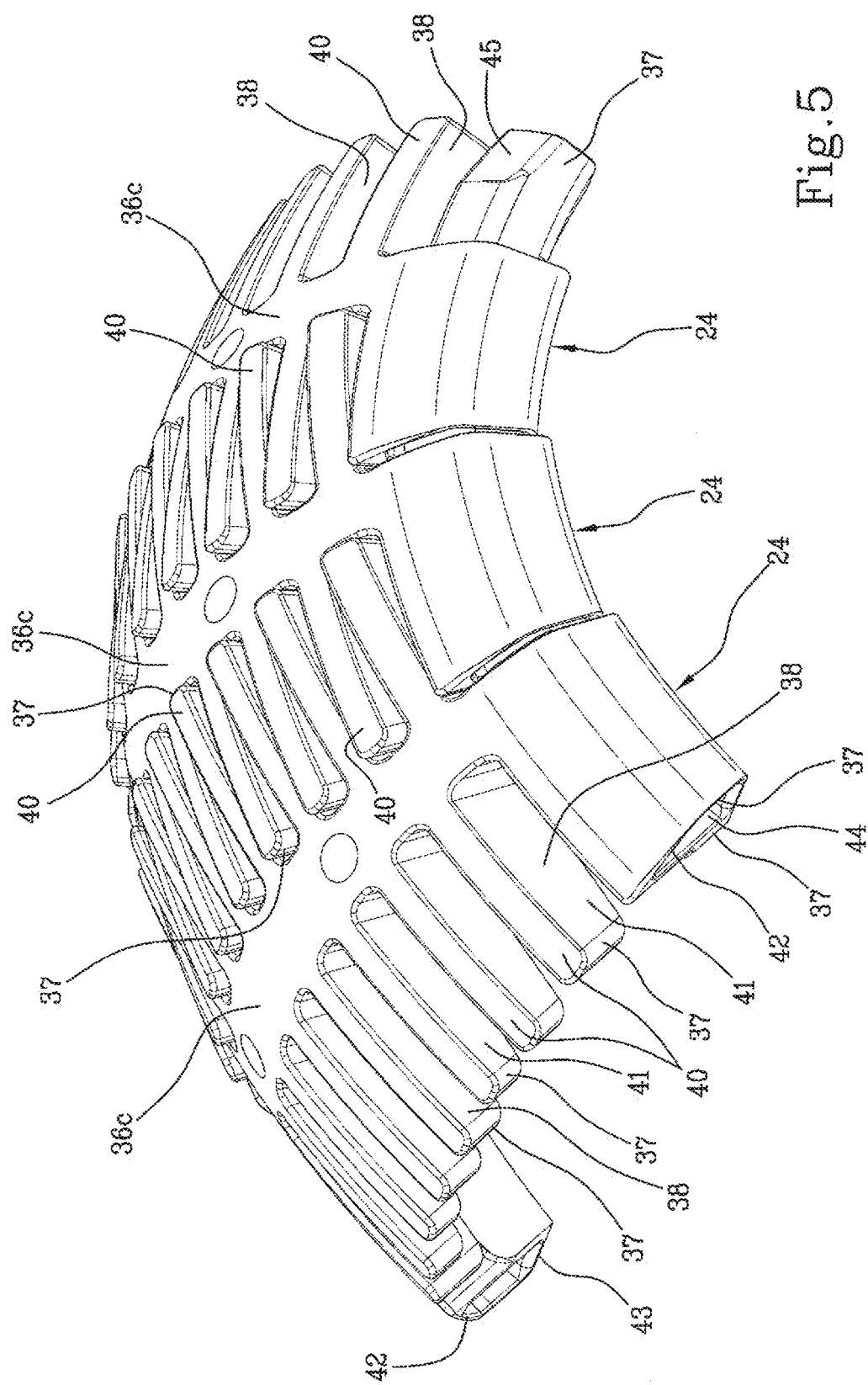
FIG. 5 shows in perspective view several sectors of a forming drum in a contracted condition.
Figure 6:
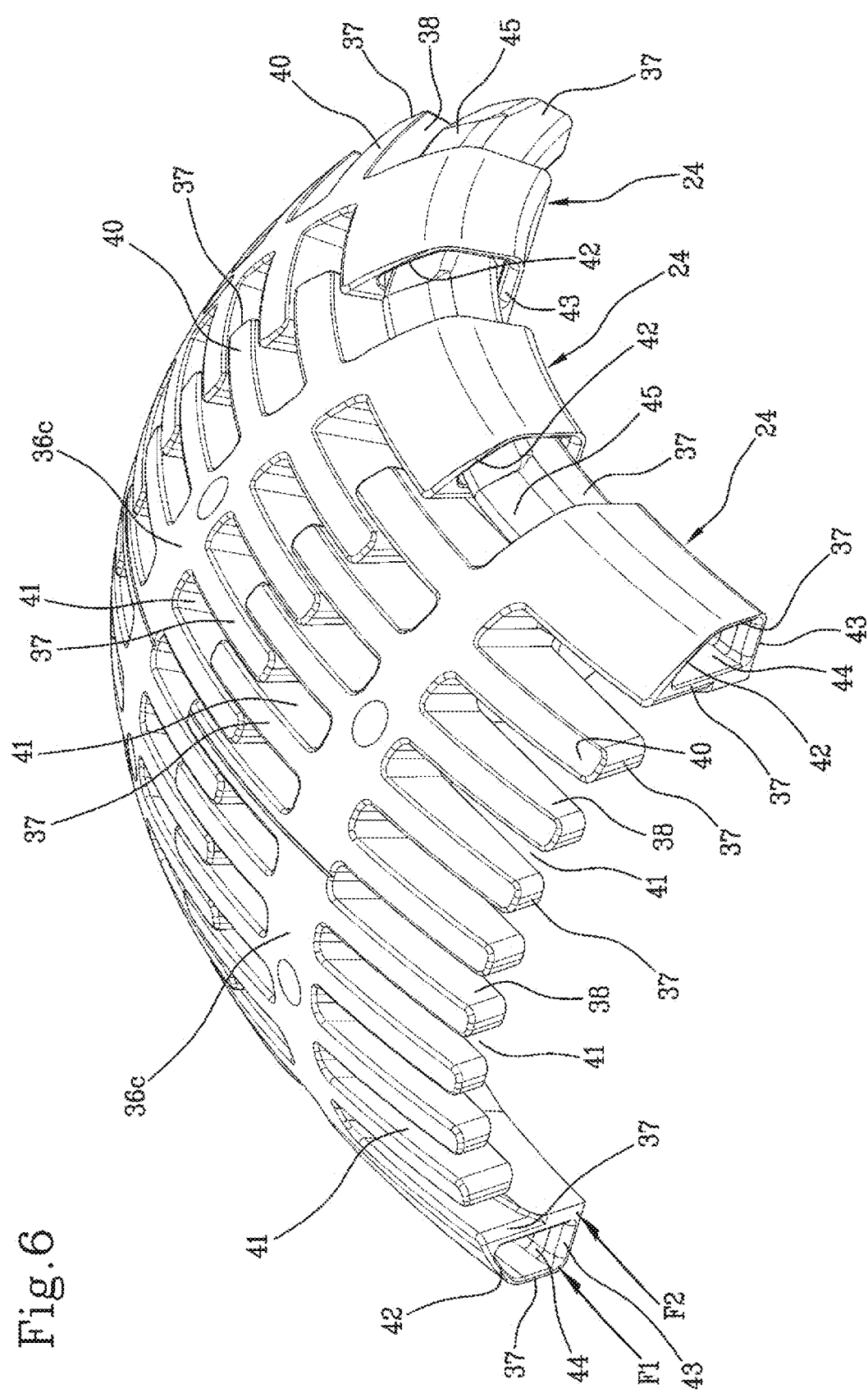
FIG. 6 shows the sectors of FIG. 5 in an expanded condition.

The carcass loading devices 47 can for example comprise a carcass handler 48 preferably operating on an external surface of the carcass sleeve 12. With a radial translation movement (with respect to the forming drum 23), the carcass sleeve 12 is first inserted, in axial alignment relation with the forming drum 23, between the flange elements 16a, 16b arranged in the loading/unloading condition of the shaping station 13 (FIG. 2). The carcass sleeve 12 is subsequently arranged around the forming drum 23, preferably following an axial translation movement of the forming drum 23 itself. More particularly, with a movement of the carriage 19 along the linear guides 20, the forming drum 23 is coaxially inserted in the carcass sleeve 12. Preferably, the translation of the carriage 19 and of the forming drum 23 terminates with the engagement of a second end 25b of the central shaft 25 with a tailstock 49, situated within the second flange element 16b (dashed line in FIG. 2).

In order for the axial movement of the forming drum 23 with respect to the carcass sleeve 12 to occur without mutual mechanical interferences, it is preferably provided that in the contracted condition the forming drum 23 has a maximum external diameter less than a minimum internal diameter of the carcass sleeve 12, typically found at the beads 6.

At the end of the axial movement, each of the annular anchoring structures 5 integrated in the beads 6 is situated in axially internal position with respect to the circumferential engagement seat 17a, 17b of the respective first and second flange element 16a, 16b.

Upon action of the axial movement devices 22, the flange elements 16a, 16b then carry the respective engagement seats 17a, 17b substantially in a relation of radial alignment within the annular anchoring structures 5.

Each of said flange elements 16a, 16b comprises expansion members (not depicted) configured for causing a radial expansion of respective circumferential sealing rings 50a, 50b integrating the circumferential engagement seats 17a, 17b. Following such radial expansion, each of the circumferential sealing rings 50a, 50b is brought to act in a thrust relation against one of the annular anchoring structures 5. The carcass sleeve 12 is thus stably constrained to the flange elements 16a, 16b. Upon completed engagement, the carcass handler 46 can disengage the carcass sleeve 12 and be moved away from the shaping station 13.

During shaping, when the carcass sleeve 12 starts to be radially expanded, the radial expansion of the forming drum can be driven by means of rotation of the threaded bar 30 upon action of the rotary driver 34.

Hence, the coupling between carcass sleeve 12 and forming drum 23 is enabled. Such coupling occurs by bringing an internal surface of the carcass sleeve 12 in contact relation against the abutment surface "S" of the forming drum 23.

In order to facilitate an expansion of the carcass sleeve 12, provision can be made such that in the final steps of approaching the condition of maximum radial expansion of the carcass sleeve 12, the flange elements 16a, 16b are axially inserted in radially internal position with respect to the sectors 24 of the forming drum 23, which is about to reach the expanded condition.

Upon completed coupling, the flange elements 16a, 16b disengage the carcass sleeve 12, leaving it on the forming drum 23.

Carcass sleeve 12 and forming drum 23, in mutual coupling relation, are adapted to be subjected to the action of deposition devices 51, in order to form components of the tyre 2 being processed by means of application of one or more elementary semifinished products in radially external position with respect to the abutment surface "S".

The deposition devices 51 can for example comprise at least one device 52 for building at least one belt layer in radially external position with respect to the shaped carcass sleeve 12. Such device 52 is preferably installed in a belt structure application station 53 that is remote with respect to said shaping station 13.

In order to allow the transfer of the forming drum 23 to the belt structure application station 53, it is provided that the forming drum 23 carrying the carcass sleeve 12 is supported by the mandrel 46 operating at the first end 25a of the central shaft 25, while the tailstock 49 is disengaged from the second end 25b of the central shaft 25 itself. With a retreating of the first flange element 16a, the shaping station 13 is brought back into the loading/unloading condition, freeing the access to an anthropomorphic robotic arm 54 or other suitable drive group, which in turn provides to engage the forming drum 23 at the second end 25b of the central shaft 25. The robotic arm 54 transfers the forming drum 23 from the shaping station 13 to the belt structure application station 53. The robotic arm 54 also provides to suitably move the forming drum 23 in front of the building device 52 for the belt layer, which for example can comprise a dispenser 55 that feeds at least one elementary semifinished product 56a, e.g. in the form of rubber-covered cord or another continuous elongated reinforcement element made of textile or metallic material. The dispenser 55 is preferably associated with a roller 57, preferably idle, or another suitable applicator member for applying the elementary semifinished product 56a at the radially external surface of the tyre 2 being processed. The roller 57 operates in thrust relation against a surface portion of the elementary semifinished product 56a, by pressing it towards the abutment surface "S" in order to cause the application thereof according to axially contiguous circumferential coils, on the carcass sleeve 12 or other radially underlying element. For example, a belt layer 7a (at 0 degrees) can thus be made by winding the elementary semifinished product in rubber-covered cord form according to circumferential coils that are axially adjacent around the abutment surface "S", while the forming drum 23 is driven in rotation and suitably moved by the robotic arm 54.

The rigidity of the forming drum 23 ensures a stable positioning of the single circumferential coils formed directly on the shaped carcass sleeve 12, without undesired deformations of the sleeve itself occurring due to the stresses transmitted on its external surface during the application. The stickiness of the raw elastomeric material that composes the carcass ply or plies 3 prevents undesired spontaneous and/or uncontrolled movements of the single circumferential coils, without it being necessary for such purpose to arrange additional intermediate layers between the belt layer 7a being made and the underlying application surface. In other words, a precise positioning is facilitated of the single circumferential coils of the belt layer 7a, directly formed according to the desired final product of the shaped carcass sleeve 12, even when such profile has an accentuated transverse curvature as is for example typically found in the tyres intended for motorcycles or other two-wheel vehicles.

The belt structure application station 53 can if required comprise devices 58 for building one or more auxiliary layers 7b, to be applied on the shaped carcass sleeve 12, before or after the application of said at least one belt layer 7a. In particular, such auxiliary layers 7b can comprise parallel textile or metallic cords, arranged according to an orientation that is tilted with respect to the circumferential extension direction of the carcass sleeve 12, preferably according to a crossed orientation between auxiliary layers 7b adjacent to each other.

By means of the robotic arm 54, or by means of a second anthropomorphic robotic arm or handler of another type, the forming drum 23 is then transferred from the belt structure application station 53 to a sidewall application station 59, preferably constituting part of a green tyre completion line integrating the same belt structure application station 53. In the sidewall application station 59, a spiralling unit 60 can for example operate, configured for winding at least one elementary semifinished product 56b in the form of a continuous elongated element made of elastomeric material according to axially adjacent and/or at least partially superimposed circumferential coils, against axially opposite lateral portions of the carcass sleeve 12 in proximity to the annular anchoring structures 5, while the forming drum 23 is driven in rotation and suitably moved, for example by the same robotic arm 54, in order to distribute the circumferential coils according to a predefined scheme. The application of the elementary semifinished product 56b in the form of a continuous elongated element also in this case occurs with the aid of a respective second applicator roller 61 operating in an analogous manner to that described with reference to the attainment of the belt layer 7a. The plant 1 can also comprise tread band attainment devices (not illustrated) which can operate in a manner analogous to the spiralling unit 60 in order to make the tread band 8 around the belt structure 7, up to close to the sidewalls 9.

The geometric and size parameters of the projections 37, and cavities 39, arranged in the forming drum 23 allow suitably supporting the carcass sleeve 12 without the latter being subjected to excessive twisting or localised stresses due to the thrust exerted by the applicator rollers 57, 61. Indeed, at each of the cavities 39, the carcass sleeve 12 is supported as a bridge between two axially contiguous projections 37. In this situation, the carcass sleeve 12 is adapted to behave like a kind of bridge-like beam supported between two supports, suitably opposing the thrust action exerted by the applicator roller 57, 61, even if such action is localised in an action area, measurable against the abutment surface "S" in a radial plane of the forming drum 23, having transverse size less than the transverse size of the hollow portions 41. This circumstance can for example be verified when the thrust action of the roller 57 is concentrated on an elementary semifinished product 56a, 56b having size smaller than the transverse size of the hollow portions 41, as exemplified in FIG. 9, or when the transverse size of the hollow portions 41 is greater than the axial size of the second applicator roller 61, as exemplified in FIG. 10.

Figure 10:
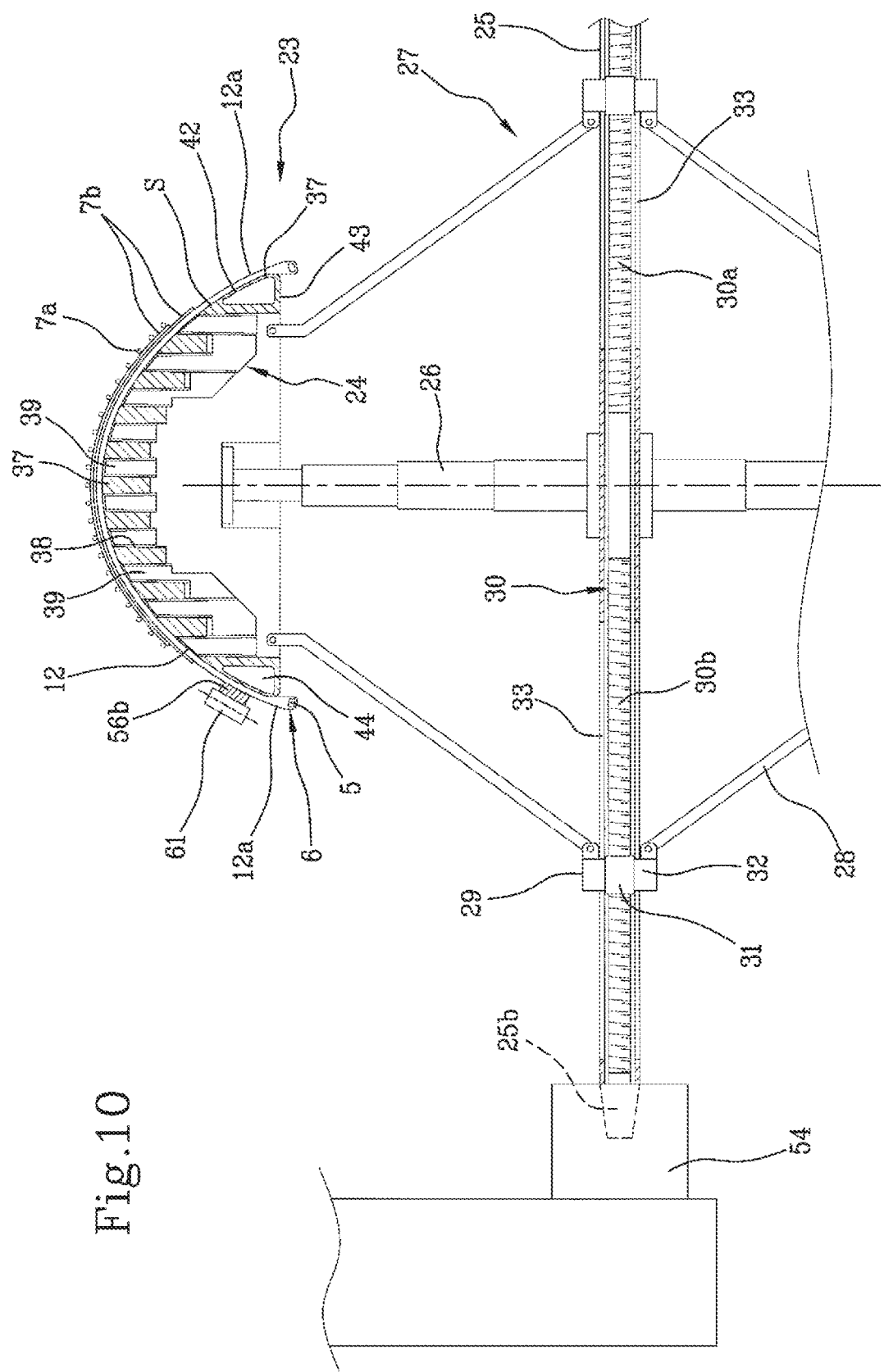
FIG. 10 shows the application of a sidewall on a belt structure coupled to the carcass sleeve.

FIG. 10 illustrates the application of the continuous elongated element, for the purpose of attaining one of the sidewalls 9. Due to the presence of the support wings 42, the abutment surface "S" is capable of effectively opposing the thrust action exerted by the second applicator roller 61, even in proximity to the zones close to the axially opposite edges of the forming drum 23, where the orientation of the abutment surface itself is substantially radial with respect to the geometric axis X-X or in any case quite tilted with respect thereto.

The thin thickness of the support wings 42, in part allowed by the structural strengthening caused by the presence of the projections 37 within the respective containment seats 44, allows reducing within acceptable limits the discontinuities created in the transition zones between each support wing 42 and the respective projection 37 inserted in the containment seat 44, as well as between the projection itself and the intermediate portion 36c of the respective sector 24. It is thus possible to effectively apply the tread band 8 and/or the sidewalls 9 up to close to the beads 6, without the carcass sleeve 12 significantly sagging under the thrust action exerted by the second applicator roller 61 which, in the absence of the support wings 42, would tend to make it "sink" towards the interior of the cavities 39, generating irregular and discontinuous stresses that could damage the structural components of the tyre during manufacturing and render the execution of the spiralling extremely difficult if not impossible.

The built green tyre 2 is finally adapted to be removed from the forming drum 23 in order to then be vulcanised in a vulcanisation unit 62.

The invention claimed is:

1. An expandable toroidal forming drum for building tyres, comprising:
    circumferentially consecutive sectors that are radially movable between a contracted condition in which said sectors are moved closer to a geometric rotation axis of the forming drum, and an expanded condition in which the sectors are radially moved away from said geometric axis in order to define a radially external abutment surface,
    wherein
        each sector has first coupling portions circumferentially opposite to second coupling portions, each of said first and second coupling portions comprising circumferential projections alternated with circumferential cavities,
        the circumferential cavities are each axially delimited between lateral walls of two axially consecutive circumferential projections,
        the circumferential projections of each sector are slidably engaged in the respective circumferential cavities of circumferentially adjacent sectors,
        the first coupling portions of each sector include at least one support wing extending integral from at least one of said circumferential projections according to an incident direction with respect to one of the lateral walls thereof, as a continuation of the abutment surface, each support wing has a first side and a second side that are respectively opposite, a thickness of each support wing is defined between the first side and the second side in a direction perpendicular to the abutment surface, the first side of each support wing coincides with a portion of said abutment surface extending between portions of the abutment surface defined by two axially adjacent circumferential projections, each support wing defines, by its second side together with the lateral walls belonging to two axially adjacent circumferential projections, a containment seat, and the containment seat slidably houses one of the circumferential projections belonging to the second coupling portion of a circumferentially adjacent sector.

2. The drum as claimed in claim 1, wherein the second side of said at least one support wing is slidably engaged with said one of the circumferential projections belonging to a circumferentially adjacent sector.

3. The drum as claimed in claim 1, wherein in the expanded condition, the abutment surface has circumferential rows of solid portions alternated with hollow portions.

4. The drum as claimed in claim 3, wherein said solid portions and hollow portions are respectively defined by said circumferential projections and by said circumferential cavities.

5. The drum as claimed in claim 1, wherein multiple support wings are provided, carried by respective circumferential projections belonging to a same sector.

6. The drum as claimed in claim 1, wherein a plurality of support wings are carried by circumferential projections arranged at axially opposite edges of each sector.

7. The drum as claimed in claim 1, wherein a plurality of support wings are carried by consecutive circumferential projections to axially external projections.

8. The drum as claimed in claim 7, wherein each support wing is integral with two respective circumferential projections that are axially consecutive to each other.

9. The drum as claimed in claim 1, wherein each sector also has at least one base wall extended between two respective circumferential projections that are axially consecutive to each other in order to define, together with the at least one base wall and with said support wing, the containment seat slidably engaging one of the projections belonging to an adjacent sector.

10. The drum as claimed in claim 1, wherein the thickness of each support wing is between 0.5 mm and 2.5 mm.

11. The drum as claimed in claim 1, wherein said circumferential projections and circumferential cavities have circumferentially elongated shape.

12. The drum as claimed in claim 11, wherein each of said circumferential cavities is axially delimited between lateral walls of two axially consecutive circumferential projections.

13. The drum as claimed in claim 12, wherein said at least one support wing is extended from the respective circumferential projection according to a direction that is tilted with respect to at least one of the lateral walls of the circumferential projection itself.

14. The drum as claimed in claim 13, wherein said lateral walls are extended according to planes that are substantially perpendicular to the geometric rotation axis of the forming drum.

15. The drum as claimed in claim 14, wherein at least some of said cavities are each axially delimited between the lateral walls of two axially consecutive circumferential projections.

16. The drum as claimed in claim 1, wherein in each sector, the circumferential projections belonging to one of said coupling portions are axially offset with respect to the circumferential projections belonging to the other coupling portion.

17. The drum as claimed in claim 1, wherein at least some of said circumferential projections have substantially plate-like structure and lie according to surfaces parallel to a circumferential extension direction of the abutment surface.

18. The drum as claimed in claim 1, wherein the circumferential projections arranged along axially opposite circumferential edges of the abutment surface each have a radially external longitudinal edge having a longitudinal profile tilted towards said geometric rotation axis.

19. The drum as claimed in claim 1, wherein in the contracted condition, the circumferential projections are inserted in the circumferential cavities according to a measurement at least equal to 80% of their length.

20. The drum as claimed in claim 1, wherein in the expanded condition, the circumferential projections are extracted from the circumferential cavities according to a measurement at least equal to 80% of their length.

21. The drum as claimed in claim 1, wherein at least in proximity to an axial centreline plane of the forming drum, each circumferential projection has an axial size comprised between about 4 mm and about 15 mm.

22. The drum as claimed in claim 3, wherein the hollow portions in the expanded condition have a circumferential size comprised between about 30 mm and about 60 mm.

23. The drum as claimed in claim 1, also comprising radial movement devices for simultaneously moving the sectors between the contracted condition and the expanded condition.

24. The drum as claimed in claim 23, wherein said radial movement devices comprise transmission mechanisms operatively engageable by actuator devices and configured for simultaneously translating the sectors from the contracted condition to the expanded condition.

25. The drum as claimed in claim 24, wherein said transmission mechanisms comprise driving levers each hinged to one of said sectors and to at least one driving collar slidably fit along a central shaft.

26. The drum as claimed in claim 25, wherein the driving collar is operatively connected to a threaded bar rotatably engaged in the central shaft.

27. The drum as claimed in claim 25, comprising two driving collars slidably engaged on the central shaft in axially opposite positions with respect to the sectors, and engaging the threaded bar at respective right hand and left hand threads.

28. The drum as claimed claim 1, wherein the sectors are carried by respective guide members that are telescopically extendable, radially extended from a central shaft.

29. The drum as claimed in claim 1, having in expanded condition a curvature ratio comprised between about 0.15 and about 0.45.

* * * * *